June 29, 1943.   W. C. OCKER   2,322,770
PROCESS USEFUL IN BLIND FLIGHT TRAINING
Original Filed July 18, 1931   2 Sheets-Sheet 1
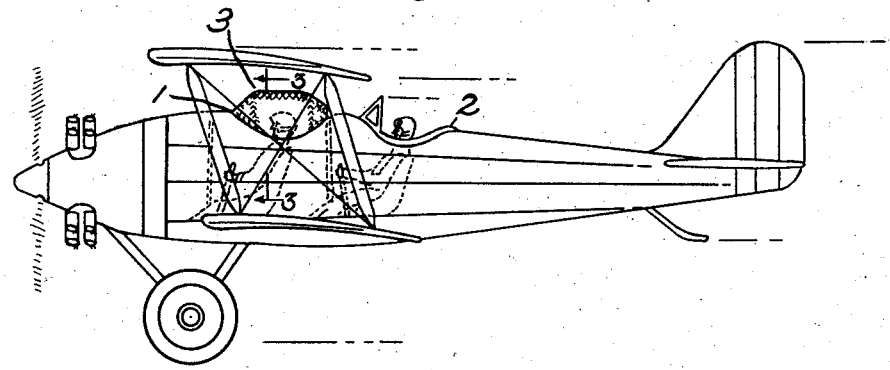
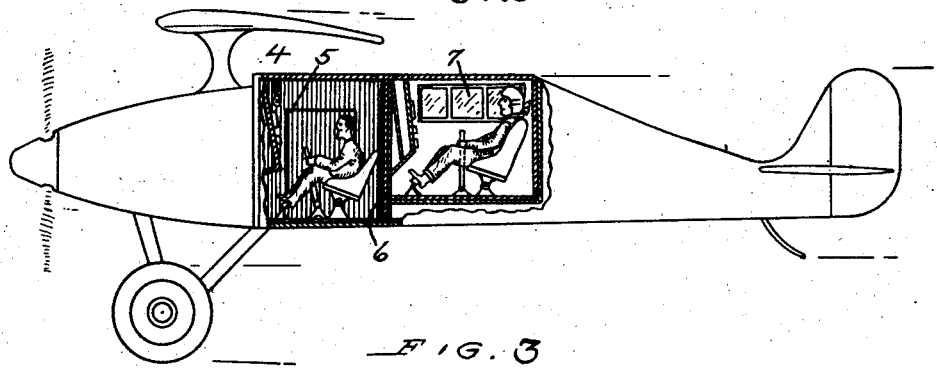
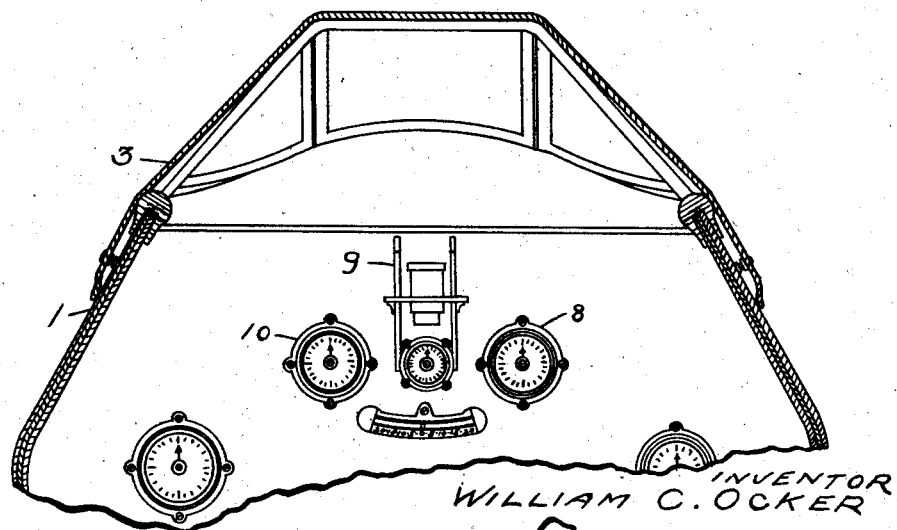
INVENTOR
WILLIAM C. OCKER
BY
ATTORNEY

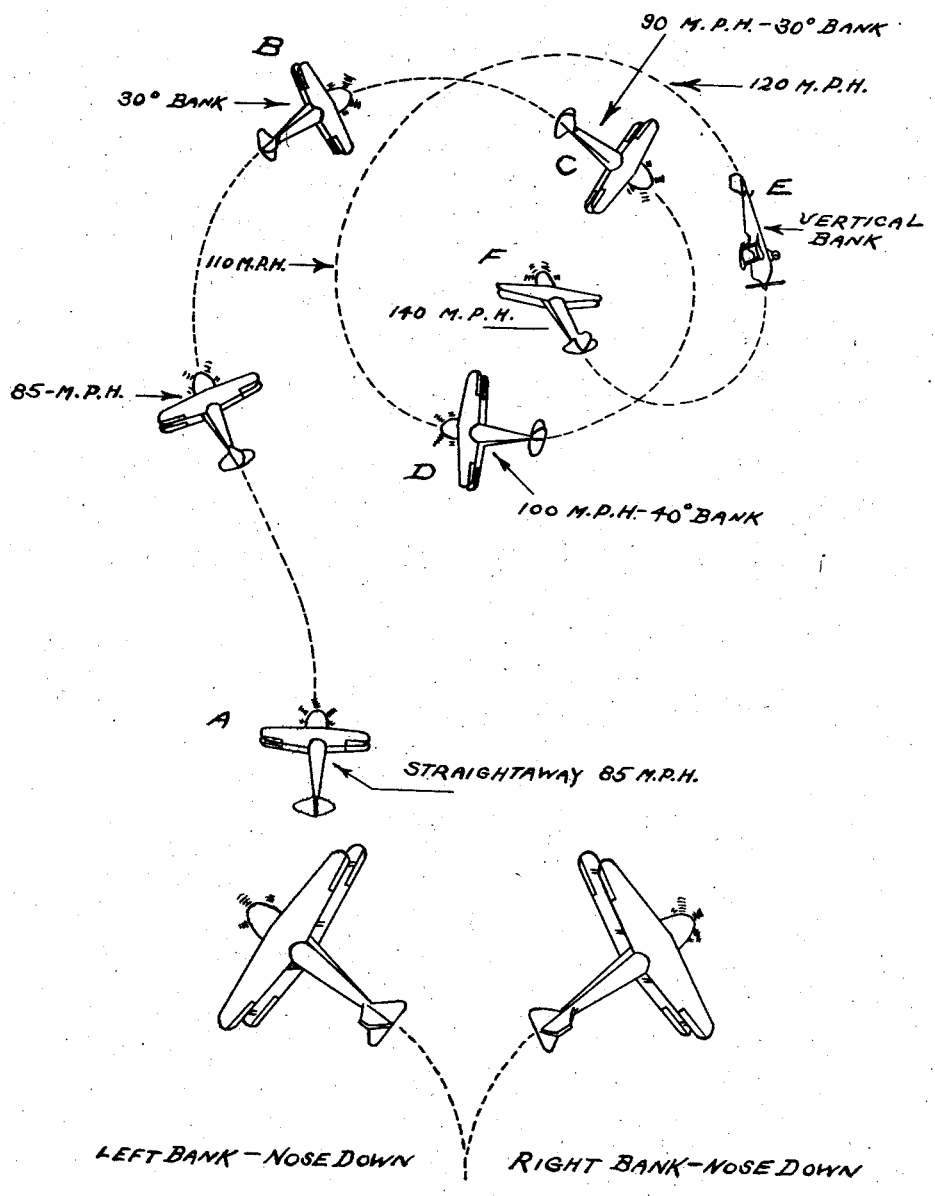

Patented June 29, 1943

2,322,770

UNITED STATES PATENT OFFICE 2,322,770

PROCESS USEFUL IN BLIND FLIGHT TRAINING

William C. Ocker, San Antonio, Tex., assignor to the Government of the United States as represented by the Secretary of War Original application July 18, 1931, Serial No. 551,606. Divided and this application October 7, 1933, Serial No. 692,595

2 Claims. (Cl. 35—12)

(Granted under the act of March 3, 1883, as amended April 30, 1928; 370 O. G. 757)

This invention described herein may be manufactured and used by or for the Government for governmental purposes, without the payment to me of any royalty thereon.

This invention relates to a process useful in training airplane pilots in the art of blind flying, by which is meant flying without a natural horizon for guidance, as occurs in fogs, clouds and thick weather, and an object of the invention is to train a pilot to fly by, and place absolute reliance in, the artificial horizon established by his flying instruments, even though such instruments read contrary to the pilot's own sensations.

This invention provides for the practical application under actual flying conditions of the ideas and principles embodied in the training device patented by me May 8, 1929, U. S. Patent No. 1,715,304, by means of which it was first successfully and forcibly demonstrated that, contrary to the then accepted theory of flight instruction, the dependence by a pilot—without a natural horizon—on his senses rather than his flight instruments will only lead him into error as to his attitude and into disadvantageous maneuvers.

Further objects and advantages of the invention will become apparent from the following description, and from the accompanying drawings, wherein:

Fig. 1 is a view of an open-cockpit type of training plane equipped for instruction in blind flying in accordance with the principles of the invention;

Fig. 2 is a view of a cabin plane reconstructed for blind flying instruction;

Fig. 3 is a vertical cross section of the covered compartment or cockpit for the student pilot;

Figs. 4 and 5 are diagrammatic views illustrating the necessity for training even experienced pilots in the art of blind flying.

As a general rule, the experienced pilot avoids fog or clouds rather than chance the hazards of blind flying and when caught endeavors to escape as rapidly as possible. During war times and at present with commercial aviation, it is not always possible to choose ideal weather conditions, nor is it possible to have continued good weather on long flights. In the past, when flying was unusual, many crashes resulted from pilots being caught in fog. Today, with instruments, crashes due to weather, especially fog, are fewer but with a better understanding of instrument flying, such as the present invention gives, crashes from fog, due to loss of "flying sense" will be eliminated.

As a result of early training methods, most pilots have felt that the flying sense was largely one of muscular balance and that visual reference played a more or less insignificant part. The aviator lays great stress on this special sense and the "feel of the ship" is usually considered the most important attainment gained from experience. Hence, flying by instruments was frowned upon by most of the early aviators and there is a general feeling among present day pilots that use of instruments is in itself evidence of lack of the so-called "feel of the ship" and a deficiency of natural flying ability. Accordingly, it has become a usual practice for an aviator, when flying without outside visual reference, to ignore the instruments and to control the airplane in response to his own sense of feel or balance on the generally accepted theory that one's own senses of equilibrium and orientation could always be depended on to furnish information as to the attitude of the airplane in the air in relation to the earth.

The fact that flying without a visual reference is unsafe has been emphasized by crashes of air mail planes and of commercial air-transport planes which endeavor to fly regardless of weather conditions. That one's own senses are far from infallible in maintaining equilibrium of the airplane in the air is also evidenced by the fact that many experienced pilots have come out of a fog to find themselves off the course with a wing down or even in inverted flying position. A very large proportion of crashes during blind flying is due to the tailspin. This conclusion is based, in part, upon observations of many airminded persons tested with my patented training device, reports of pilots making long distance flights, and reports of the few pilots who have survived such crashes. From carefully conducted experiments in plotting the course of a blind flyer, it has been found, without exception, that no subject pilot maintained a straight and level course for any appreciable length of time but soon banked the airplane into a spiral course terminating in a diving spiral. By means of my patented apparatus hereinabove identified, and also in my application filed July 18, 1931, Serial No. 551,606, entitled "Method of blind flight instructions" of which this application is a division, it has been demonstrated that after a spin the usual information from the senses regarding attitude and motion is false and that a pilot can never trust his sensations unless he has an horizon by which to check them. If a pilot, flying in a fog, maneuvers into a spin and then comes out, he has the sensation of spinning in the opposite direction. If he corrects for the supposed spin, this "correction" puts him in another spin and this may continue in a vicious circle until he crashes. His only hope, therefore, is to disregard his sensations and fly by his instruments.

The failure to make proper use of the instruments is due, principally, to a lack of confidence in flying instruments, ignorance of the fact that they furnish an artificial horizon for the visual reference and guidance of the pilot in fog, and ignorance of the fact that the pilot's sense of feel or balance may be interpreted contrary to fact. To follow one's instrument, even after a demonstration as to the absolute unreliability (under certain conditions) of his own sense of direction and movement is difficult without special training, because these erroneous sensations the pilot receives are overpowering until he has been trained to disregard them. In this connection, it is interesting to note that trained flyers were found to be unable to blind-fly a course by instruments without re-education even though they realized its necessity. They had been flying too long "by feel" to be able suddenly to disregard their sensations. On the other hand, untrained or very slightly trained flyers are found to do fairly well because of having nothing to unlearn.

Following preliminary training, after the pilot is convinced of the necessity for complete reliance on his instruments when in fog or clouds, the training is carried on in an airplane under conditions simulating those of fog or clouds. This flight training is carried out in a training plane either of the open cockpit type or the cabin type. The former is shown in Figure 1 and embodies tandem cockpits 1 and 2, the forward one of which is occupied by the student-pilot while the other is occupied by the instructor pilot. A detachable hood 3 covers the forward cockpit and completely encloses the student pilot so that he has no outside visual reference and is compelled to rely, for flight purposes, either upon the artificial horizon provided by his flight instruments or upon his own sensations. In the cabin plane, Fig. 2, the student pilot is completely enclosed in the forward compartment 4 by covering the windows as at 5, to prevent any vision out and a partition 6 separates the student pilot in the blinded compartment from the safety pilot in the rear compartment 7.

The relative arrangement of the cockpit and compartment is not essential and the student compartment may, if desired, be behind the safety pilot seat. In either case, the training plane is equipped with duplicate sets of flight instruments, one for each pilot, dual controls and telephonic means of communication between the pilots. Each instrument set includes among others, as shown in Fig. 3, the usual air speed indicator 8, turn-and-bank indicator 9, and altimeter 10. The safety pilot handles the controls when taking off and landing the airplane, but turns the controls over to the student pilot at a safe altitude. The "blind pilot" is then instructed to take control of the plane and after doing so invariably directs it along the course graphically shown in Fig. 4. This course will involve at least two (as shown in Fig. 4), and never more than ten continuous circles within a time interval of one to two minutes before the pilot is disoriented with respect to the surface of the earth and it is necessary for the instructing pilot to take over control of the plane. Just prior to taking over control of the plane the instructing pilot restores outside vision to the student pilot so that the latter by observing the dangerous position into which the airplane has been maneuvered will be forceably impressed with the necessity of disregarding normal reactions and of following instrument readings. A number of hours are given over to practice flights, with the safety pilot touching the controls only when necessary to bring the airplane back into control, until the student has become accustomed to fly by instruments as against instinct and is able to take-off, fly, maneuver, and land without outside visual reference or in other words until the reflex actions of the student pilot have been properly changed.

The spiral course taken by a pilot depending on his senses rather than on his instruments when flying blind is graphically shown in Fig. 4. Assume at A, a pilot at 4,000 feet. Even though he has his instruments, but lacks proper training, he will start circling, let it be assumed to the right. When the airplane gets in a position as shown at B, the pilot will have his plane banked 30 to 40 degrees although he will feel that he is flying straight and level. He will not have any knowledge of his right wing being down or of the fact that he is circling to the right. On the contrary, he will feel that he is flying straight and in many cases think he is turning to the left. A glance at his instruments will show him the true position of his plane. However, flying by his own sense of feel or balance, he will correct for a slight left turn, with the result that he puts his plane in a still steeper bank to the right. The speed of the plane increases as the nose drops, as indicated at position C and the natural action of the pilot is to move the stick back to check the increasing speed. The plane being at this time in practically a vertical bank, the result of this maneuver is a very steep right hand power spiral, as indicated at D and E. The inevitable result of this is a tail spin, at an air speed of 140 M. P. H. or more, as at F. Numerous tests have demonstrated that in the absence of blind flight training, and regardless of previous flying experience, a pilot when given control of a plane will invariably follow a right or left hand course similar to that described in the preceding paragraph and shown in Fig. 4. Due to the course taken by the plane, its inclination laterally and longitudinally with respect to the earth's surface and its flying speed, the pilot will become entirely disoriented relative to the surface of the earth and to the direction of flight; that is to say, the pilot will be under the impression that the earth rather than the plane is banked and that the plane is turning in a direction opposite to its actual direction of flight. In other words assuming the course of the plane to be that shown in Fig. 4, although the plane is rapidly approaching a vertical bank preliminary to a spin and is turning to the right the pilot will be under the impression that the plane is on a level keel and is turning to the left. Investigation of this phenomena and an analysis of the course, invariably taken by the untrained pilot upon assuming control of a plane, led to the discovery upon which the instant invention is based, namely that subjecting the pilot to a course involving at least two continuous circles with the plane banked within the banking range of 30° to 40° and traveling at a speed of at least 80 miles an hour will develop erroneous sense reactions which if acted upon will, to say the least, jeopardize both the plane and its pilot.

The reaction is very much the same as if they did not have the instruments. Until pilots have been instructed in their use and trained to ignore their own reflexes, blind flying will always be a dangerous practice. The conflict between the pilot's own sensations and the indications of the instruments is illustrated in Fig. 5. When the pilot's senses, for example, indicate the attitude of the plane as being a left bank-nose down, the actual attitude as indicated by the instruments will be a right bank-nose down. A little time in the air in a covered cockpit will demonstrate this and the proper training will enable the pilot to disregard his erroneous sensations.

The preliminary training in the revolving chair is not essential, though it may be desirable, and the candidate's training may be initially carried on in a training plane with the hooded cockpit. It has been found, by experience, that a pilot trained to fly in this manner may be less apprehensive when caught in bad weather than one instructed in the normal flight training, since his first experiences in the air have been in the hooded cockpit and hence, without outside visual reference.

Experiments prove that if the pilot is thoroughly familiar with the reason as to why he must fly by his instruments in fog, and then is later trained, as herein described, to fly by instrument, he will not revert to flying by instinct or sense of feel if the hood or cover of the cockpit is opened while the airplane is flying in fog.

Having described my invention, what I claim as new and wish to secure by Letters Patent is:

1. Process useful in blind flight training comprising subjecting a person to the effect of all the factors, including that of non-visibility, normally associated with flying in an airplane in a fog without flying instruments and maintaining said factors under control, to thereby produce in the person a predetermined mental state of false conviction as to the position and direction of movement of the plane relatively to the ground which governs his reflex actions with respect to the airplane controls, and then at a predetermined time subjecting the person to the effect of the factor of visibility of the ground to thereby change said mental state of the person to a state of true appreciation of the position and direction of movement of the plane relatively to the ground and also change his reflex actions as to the airplane controls.

2. Process useful in blind flight training comprising subjecting a person to the effect of all the factors, including that of non-visibility, normally associated with flying in an airplane in a fog without flying instruments and maintaining said factors under control, to thereby produce in the person a predetermined mental state of false conviction as to the position and direction of movement of the plane relatively to the ground which governs his reflex actions with respect to the airplane controls, and then at a predetermined time subjecting the person to the effect of the factors of visibility of the ground and the sight of operating flying instruments in the plane to thereby change said mental state of the person to a state of true appreciation of the position and direction of movement of the plane relatively to the ground and also change his reflex actions as to the airplane controls.

WILLIAM C. OCKER.